United States Patent
Furukawa et al.

(10) Patent No.: US 8,653,707 B2
(45) Date of Patent: Feb. 18, 2014

(54) MOTOR HAVING AN ENCODER TO DETECT ROTATION OF A ROTATING BODY

(75) Inventors: Keizo Furukawa, Kyoto (JP); Nobuyuki Iwashita, Kyoto (JP); Koichi Okumura, Kyoto (JP)

(73) Assignee: Nidec Corporation, Kyoto (JP)

( * ) Notice: Subject to any disclaimer, the term of this patent is extended or adjusted under 35 U.S.C. 154(b) by 106 days.

(21) Appl. No.: 13/205,042

(22) Filed: Aug. 8, 2011

(65) Prior Publication Data
US 2012/0043862 A1  Feb. 23, 2012

(30) Foreign Application Priority Data
Aug. 17, 2010 (JP) ................... 2010-182546

(51) Int. Cl.
*H02K 11/00* (2006.01)
*H02K 5/00* (2006.01)
*H02K 5/16* (2006.01)

(52) U.S. Cl.
USPC .............................. 310/68 B; 310/89; 310/90

(58) Field of Classification Search
USPC .............. 310/68 B, 89, 90; 324/207.25; 318/400.26; 250/231.13
See application file for complete search history.

(56) References Cited

U.S. PATENT DOCUMENTS

| 3,050,832 | A | * | 8/1962 | Scheldorf | ........................ 29/596 |
| 4,463,291 | A | * | 7/1984 | Usry | ........................ 318/400.26 |
| 6,933,649 | B2 | | 8/2005 | Fujii et al. | |
| 7,197,823 | B2 | | 4/2007 | Fujii et al. | |
| 7,294,944 | B2 | | 11/2007 | Fujii | |
| 7,576,467 | B2 | | 8/2009 | Yamamoto et al. | |
| 2004/0217669 | A1 | | 11/2004 | Fujii et al. | |
| 2006/0071563 | A1 | * | 4/2006 | Fujii | ........................ 310/68 R |
| 2006/0208173 | A1 | * | 9/2006 | Nakamura et al. | ....... 250/231.13 |
| 2009/0146516 | A1 | * | 6/2009 | Yano et al. | .................... 310/152 |
| 2010/0084934 | A1 | | 4/2010 | Iwasa et al. | |
| 2010/0109491 | A1 | * | 5/2010 | Miyazaki et al. | ........... 310/68 B |
| 2011/0012457 | A1 | * | 1/2011 | Ikitake et al. | ................... 310/91 |

FOREIGN PATENT DOCUMENTS

| JP | 11-215775 A | 8/1999 |
| JP | 2005-229698 A | 8/2005 |
| JP | 2005229698 A | * 8/2005 |

OTHER PUBLICATIONS

Machien Translation JP2005229698.*
Furukawa et al., "Motor and Motor Manufacturing Method"; U.S. Appl. No. 13/004,046, filed Jan. 11, 2011. Not Enclosed.

* cited by examiner

*Primary Examiner* — Tran Nguyen
*Assistant Examiner* — Jose Gonzalez Quinones
(74) *Attorney, Agent, or Firm* — Westerman, Hattori, Daniels & Adrian, LLP (57) ABSTRACT

A motor includes a shaft, a bearing arranged to support the shaft such that the shaft is rotatable about a central axis, a rotating body fixed to the shaft and including a rotor magnet arranged in an outer circumference thereof, a stator arranged radially outward of the rotor magnet, a circuit board arranged to be perpendicular to the central axis on one axial side of the rotating body, and an encoder arranged to detect rotation of the rotating body. The encoder includes a reflection pattern arranged on a surface of the rotating body which is opposed to the circuit board, and a reflective rotation detection sensor arranged on the circuit board to detect the rotation of the rotating body by irradiating the reflection pattern with light.

12 Claims, 8 Drawing Sheets

MOTOR HAVING AN ENCODER TO DETECT ROTATION OF A ROTATING BODY

BACKGROUND OF THE INVENTION

1. Field of the Invention

The present invention relates to an inner-rotor motor including an encoder.

2. Description of the Related Art

Inner-rotor motors have often been used as driving sources in office machines, such as copy machines and multifunctional devices, and household electrical appliances. Some of such motors include encoders, as described in JP-A 11-215775 and JP-A 2005-229698, for example.

In a motor disclosed in JP-A 11-215775, a slit disc of an encoder is arranged to project radially outward from a rotor yoke. This results in an increase in the radial dimension of the motor. In general, in the case of an encoder including a transmissive sensor, if an encoder disc including slits defined therein is moved in an axial direction, the disc and the sensor come into contact with each other, resulting in a damage of the disc. Moreover, it is necessary to insert the disc through a gap in the sensor for installation of the disc. This complicates an operation of assembling the motor.

In a brushless motor described in JP-A 2005-229698, a disc of an encoder is arranged inside a rotor yoke. This complicates assembling of the motor. Moreover, the motor has to have an increased axial dimension in order to secure a space for the disc.

As such, there has been a demand for a reduction in the axial dimension of the motor, an improvement in reliability of the encoder, or a reduction in the number of steps in assembling the motor.

SUMMARY OF THE INVENTION

A motor according to a preferred embodiment of the present invention includes a shaft; a bearing arranged to support the shaft such that the shaft is rotatable about a central axis; a rotating body fixed to the shaft, and including a rotor magnet arranged in an outer circumference thereof; a stator arranged radially outward of the rotor magnet; a circuit board arranged to be perpendicular or substantially perpendicular to the central axis on one axial side of the rotating body; and an encoder arranged to detect rotation of the rotating body. The encoder includes: a reflection pattern arranged on a surface of the rotating body which is opposed to the circuit board; and a reflective rotation detection sensor arranged on the circuit board to detect the rotation of the rotating body by irradiating the reflection pattern with light.

DETAILED DESCRIPTION OF THE PREFERRED EMBODIMENTS

Figure 1:
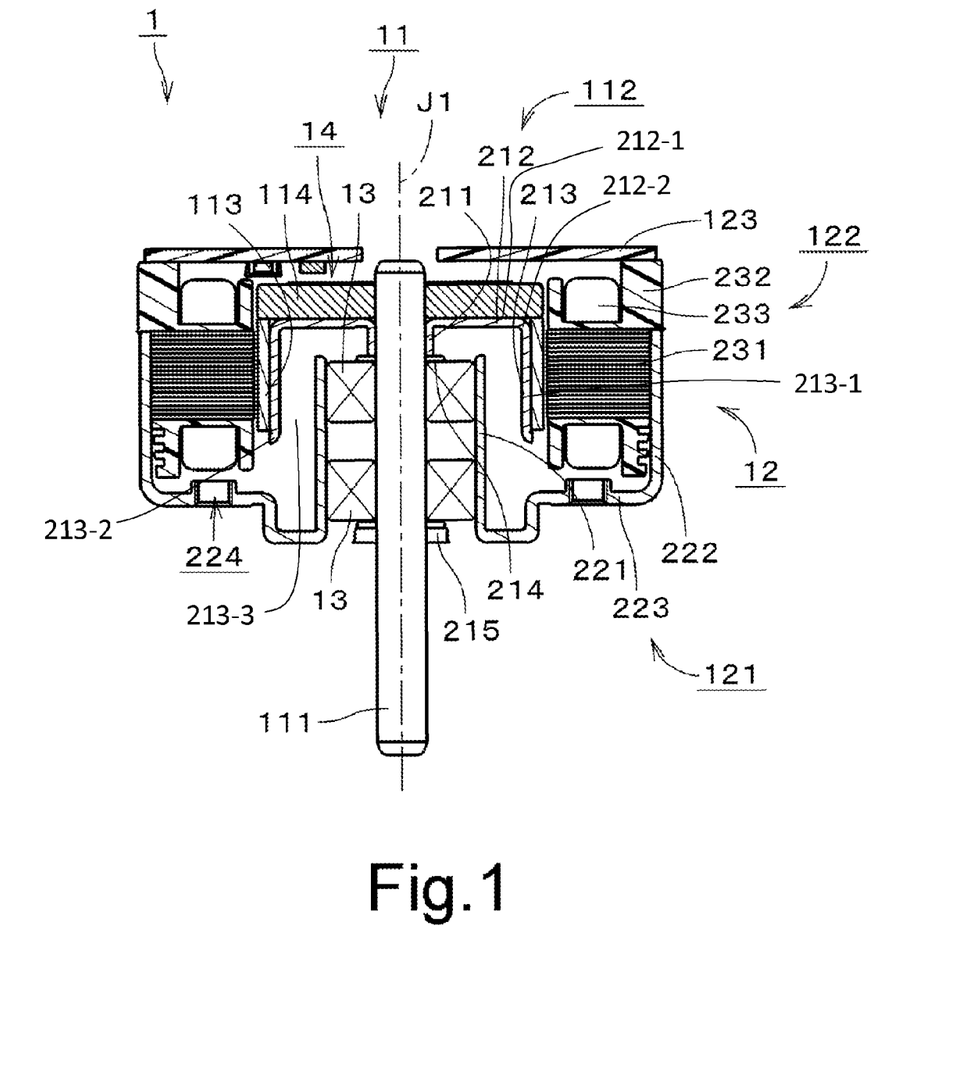
FIG. 1 is a vertical cross-sectional view of a motor according to a first preferred embodiment of the present invention.

It is assumed herein that an upper side and a lower side in a direction parallel to a central axis in FIG. 1 are referred to as an "upper side" and a "lower side", respectively. The terms "upper side" and "lower side" used herein do not necessarily correspond with the direction of gravity. In addition, a circumferential direction about the central axis is referred to as a "circumferential direction", a radial direction centered on the central axis is referred to as a "radial direction", and the direction parallel to the central axis is referred to as an "axial direction". The above definitions hold true with other similar figures described below.

First Preferred Embodiment

FIG. 1 is a vertical cross-sectional view of a motor 1 according to a first preferred embodiment of the present invention. The motor 1 is, for example, an inner-rotor brushless motor used as a driving source in an office machine such as a copy machine, a printer, or a multifunctional device.

The motor 1 includes a rotating portion 11, a stationary portion 12, at least one bearing 13, and an encoder 14. The rotating portion 11 is arranged to rotate about a central axis J1 extending in a vertical direction. In FIG. 1, an output shaft is oriented downward below the rotating portion 11. Note that the output shaft may be arranged on an upper side of the rotating portion 11. A gear and so on are attached to the output shaft. The number of bearings 13 is two in the present preferred embodiment. The bearings 13 are fixed to the stationary portion 12 to rotatably support the rotating portion 11. The bearings 13 are oil-impregnated sleeves in the present preferred embodiment.

The rotating portion 11 includes a shaft 111, a rotor holder 112, a rotor magnet 113, and a position detection-use magnet 114. The shaft 111 is substantially columnar and centered on the central axis J1. The shaft 111 is rotatably supported by the bearings 13. The rotor holder 112 is attached to a portion of the shaft 111 on a side opposite to an output side. The rotor holder 112 includes a shaft fixed portion 211, a lid portion 212, and a cylindrical portion 213. The shaft fixed portion 211 is fixed to the shaft 111 above the upper bearing 13. The lid portion 212 is arranged to spread radially outward from an upper end of the shaft fixed portion 211. The lid portion 212 has an upper portion 212-1. The cylindrical portion 213 is arranged to extend downward from a first edge 212-2 of the lid portion 212. The cylindrical portion 213 has a circumferential surface 213-1. The cylindrical portion forms an inner space 213-3. A part of the bearing 13 is housed inside the inner space 213-3.

The rotor magnet 113 is fixed to an outside surface of the cylindrical portion 213. The rotor magnet 113 may be arranged in the shape of a cylinder, or may be replaced with a plurality of magnets arranged in the circumferential direction. The rotor holder 112 is defined by subjecting a thin plate to press working. The thin plate is, for example, defined by a metallic magnetic body. The rotor holder 112 may be defined by other processing methods (e.g., a cutting process, etc.). A resin sheet 214, which defines a washer, is arranged between the shaft fixed portion 211 and the upper bearing 13. A stop 215 is attached to the shaft 111 below the lower bearing 13.

The shaft fixed portion 211 and the stop 215 combine to prevent vertical movement of the shaft 111.

The stationary portion 12 includes a cover member 121, a stator 122, and a circuit board 123. The cover member 121 includes an inner tubular portion 221, an outer tubular portion 222, and a bottom portion 223. Both of the inner tubular portion 221 and the outer tubular portion 222 are cylindrical and centered on the central axis J1, and are arranged to be coaxial with the central axis J1.

The bottom portion 223 is arranged to join a lower end of the outer tubular portion 222 and a lower end of the inner tubular portion 221 to each other. The bottom portion 223 includes a plurality of fitting holes 224 defined therein. The fitting holes 224 are, for example, used to fit the motor 1 to a desired location in the office machine. In the motor 1, the fitting holes 224 are defined in the bottom portion 223, and the output shaft is arranged to project downward below the bottom portion 223. This contributes to ensuring sufficient strength with which the motor 1 is attached to the office machine. Moreover, the circuit board 123 and the encoder 14 are arranged not on the bottom portion 223 but on the side opposite to the side where the output shaft is arranged. This makes it possible to locate the stator 122 closer to the bottom portion 223, and makes it easier to position the center of generation of a torque within a bearing span. Furthermore, a portion of the bottom portion 223 and a portion of the inner tubular portion 221 are arranged to together define a projecting portion(s) arranged to project axially downward where the bottom portion 223 and the inner tubular portion 221 meet. Either a single projecting portion may be arranged to extend across an entire circumference, or a plurality of projecting portions may be arranged in the circumferential direction. Furthermore, the projecting portion(s) are arranged to project axially downward below the lower bearing 13. It is possible to use the projecting portion(s) to position the motor 1 in relation to the office machine, for example.

The bearings 13 are supported by an inside surface of the inner tubular portion 221. The stator 122 is supported by an inside surface of the outer tubular portion 222. The cover member 121 is defined, for example, by subjecting a metallic plate material to press working. The cover member 121 is preferably made of an electrically conductive material. Moreover, the cover member 121 is preferably made of a magnetic material. Note that the cover member 121 may not necessarily be defined by press working, but may be defined by other processing methods (e.g., a cutting process, etc.).

The stator 122 includes a stator core 231, an insulator 232, and coils 233. The stator 122 is annular and centered on the central axis J1. The stator core 231 is defined by a plurality of thin magnetic steel sheets placed one upon another in the vertical direction. The stator core 231 includes a core back and a plurality of teeth. The core back is annular. The core back of the stator core 231 is press fitted to the outer tubular portion 222. Each of the teeth of the stator core 231 is arranged to extend radially inward from the core back. A top of each of the teeth is arranged radially opposite the rotor magnet 113. That is, the stator 122 is arranged radially outside the rotor magnet 113. The insulator 232 is arranged to cover the stator core 231.

An upper surface of the stator core 231 and an upper end of the outer tubular portion 222 are arranged to align with each other in the vertical direction. The height of the outer tubular portion 222 is thereby minimized without a reduction in the strength with which the stator core 231 is fixed to the outer tubular portion 222. An outside surface of an upper portion of the insulator 232 is arranged radially outward of the inside surface of the outer tubular portion 222 above the outer tubular portion 222. In other words, a portion of an outside surface of the motor 1 is defined by the outside surface of the insulator 232.

The circuit board 123 is arranged above the insulator 232. The circuit board 123 is arranged to be perpendicular or substantially perpendicular to the central axis J1. Currents are supplied to the coils 233 through the circuit board 123 to generate the torque between the stator 122 and the rotor magnet 113, and thereby to rotate the rotating portion 11 about the central axis J1.

Figure 2:
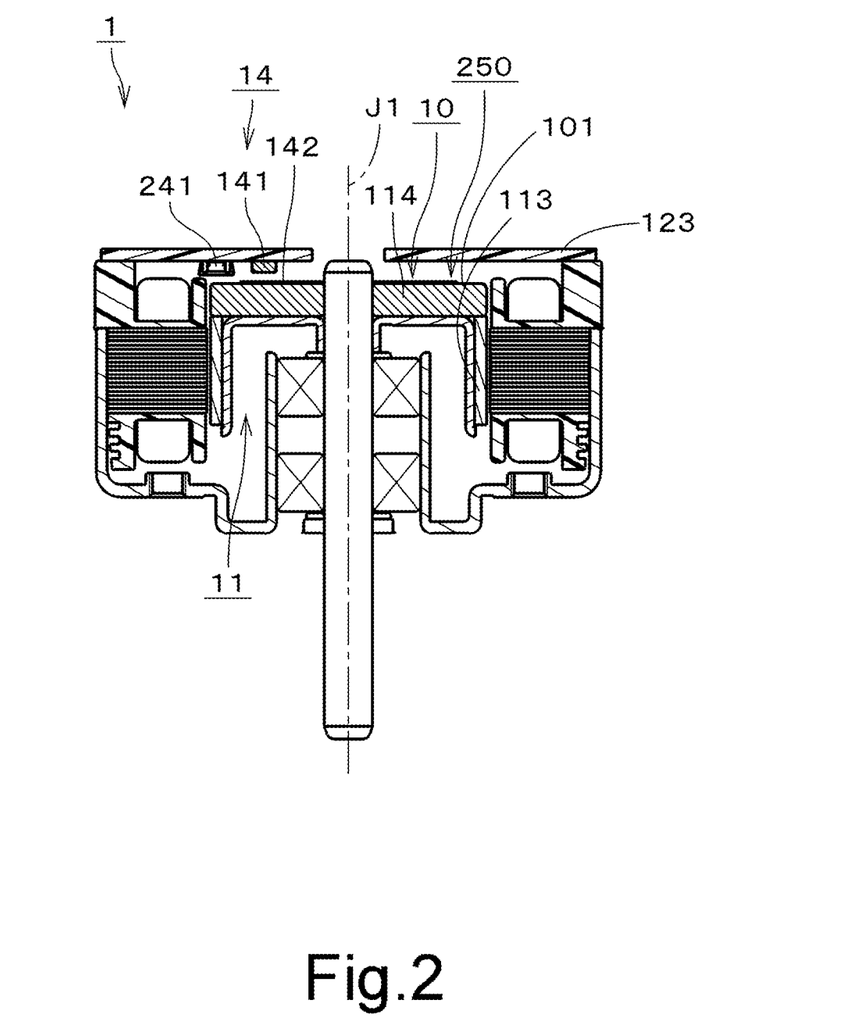
FIG. 2 is a vertical cross-sectional view of the motor according to the first preferred embodiment.

Referring to FIG. 2, a position detection sensor 241 is mounted on the circuit board 123. The position detection sensor 241 is arranged axially opposite the position detection-use magnet 114. The position detection-use magnet 114 is annular and centered on the central axis J1. The position detection-use magnet 114 includes multiple magnetic poles arranged in the circumferential direction. The position detection sensor 241 includes a Hall element. The position detection sensor 241 is arranged to detect magnetic field generated by the position detection-use magnet 114 through the Hall element, and thereby to detect a rotational position of the rotating portion 11.

Figure 3:
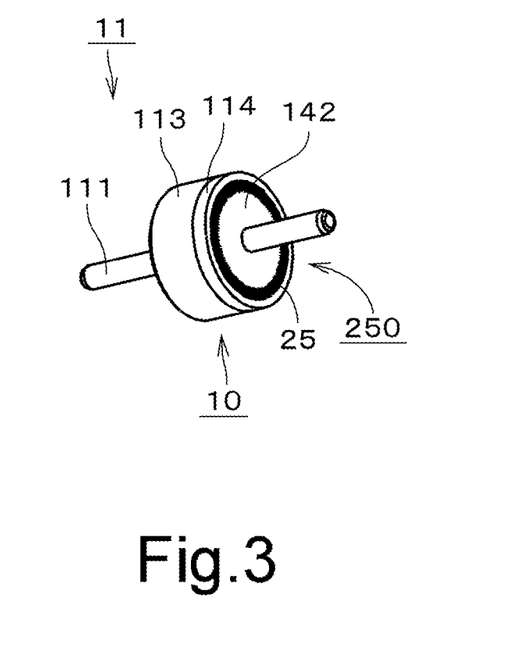
FIG. 3 is a perspective view of a rotating portion according to the first preferred embodiment.
Figure 4:
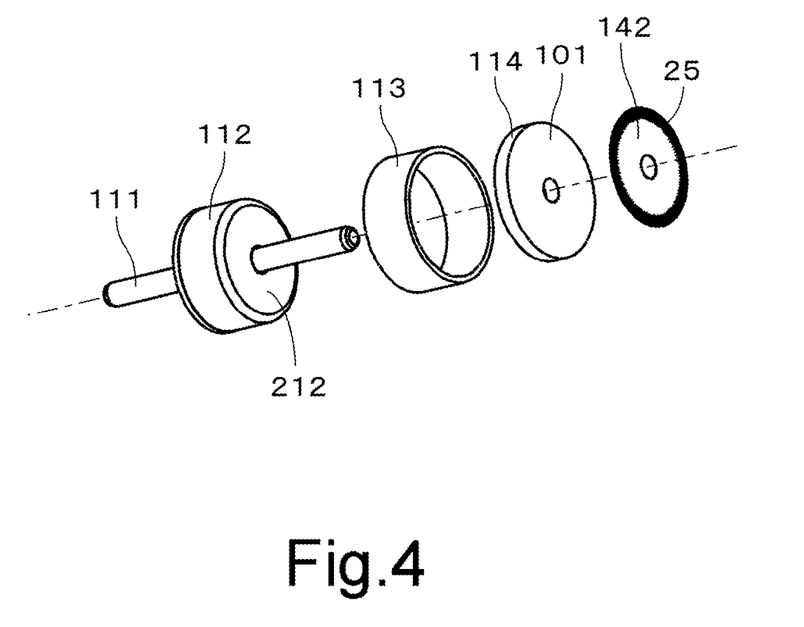
FIG. 4 is an exploded perspective view of the rotating portion.

The encoder 14 includes a rotation detection sensor 141 and a magnetic sheet 142. The rotation detection sensor 141 is attached to a surface of the circuit board 123 which faces the rotating portion 11. FIG. 3 is a perspective view illustrating the rotating portion 11 and the magnetic sheet 142. FIG. 4 is an exploded perspective view illustrating the rotating portion 11 and the magnetic sheet 142. As described above, in assembling the rotating portion 11, the rotor holder 112 is first fixed to the shaft 111. Thereafter, the rotor magnet 113 is adhered and thereby fixed to an outer circumferential surface of the rotor holder 112. Then, the position detection-use magnet 114 is adhered to the lid portion 212. The rotating portion 11 is assembled in the above-described manner.

The magnetic sheet 142 is a disc-shaped magnetic body, and is arranged to be perpendicular or substantially perpendicular to the central axis J1. The magnetic sheet 142 is a so-called encoder disc. The magnetic sheet 142 is, for example, made from a stainless steel sheet. The magnetic sheet 142 includes a large number of slits 25 arranged in the circumferential direction defined therein. A surface of the position detection-use magnet 114 is exposed through the slits 25. The magnetic sheet 142 is stuck to an upper surface of the position detection-use magnet 114. The magnetic sheet 142 may be fixed thereto with an additional use of an adhesive. Note that the magnetic sheet 142 may be replaced with a non-magnetic disc made of a resin or the like adhered onto the position detection-use magnet 114.

A surface of the magnetic sheet 142 defines a reflective surface having a metallic luster. The surface of the position detection-use magnet 114 is less capable of reflecting light than the magnetic sheet 142. Suppose that the rotor holder 112, the rotor magnet 113, and the position detection-use magnet 114 together constitute a rotating body 10. Then, the rotating body 10 is fixed to the shaft 111. The rotor magnet 113 is arranged in an outer circumference of the rotating body 10. Referring to FIG. 2, the circuit board 123 is arranged on an upper side, i.e., one side, of the rotating body 10 in the axial direction. The magnetic sheet 142 is fixed onto the position detection-use magnet 114. Referring to FIG. 3, a reflection pattern 250 designed for the encoder is arranged on a surface 101 of the rotating body 10 which is opposed to the circuit board 123. Referring to FIGS. 2 and 4, in the present preferred embodiment, the surface 101 of the rotating body 10 which is opposed to the circuit board 123 is the upper surface of the position detection-use magnet 114.

The rotation detection sensor 141 is a reflective sensor, and includes a light emitting portion and a light receiving portion. The reflection pattern 250 is irradiated with light emitted from the light emitting portion. Intensity of light received by the light receiving portion fluctuates intermittently during rotation of the rotating portion 11. Accordingly, a pulse signal indicative of the rotation of the rotating portion 11 is generated in the rotation detection sensor 141. The rotational speed of the rotating portion 11 is thereby detected accurately. In other words, the rotation of the rotating body 10 is detected by the encoder 14.

In the motor 1, the reflection pattern 250 is provided on the rotating body 10, while the rotation detection sensor 141 is provided on the circuit board 123. The motor 1 is thereby able to achieve reduced axial dimension compared with the case where a transmissive sensor is provided as in related art. Moreover, in contrast to the case where the transmissive sensor is provided, a cumbersome step of inserting a disc with slits defined therein through a gap in the sensor is not needed. This results in a reduction in the number of steps in assembling the motor 1. Furthermore, unlike an encoder disc made of a resin, the magnetic sheet 142 is free from thermal deformation because the magnetic sheet 142 is made of a metal.

The magnetic sheet 142 is arranged on the position detection-use magnet 114. Therefore, the magnetic sheet 142 is prevented from being deformed by the action of an external force. An improvement in reliability of the encoder 14 is thereby achieved. Portions of the position detection-use magnet 114 are used as portions of the reflection pattern 250. The structure of the motor 1 is thereby simplified. Moreover, the magnetic sheet 142 is stuck to the position detection-use magnet 114. The reflection pattern 250 designed for the encoder is thereby defined easily.

In the present preferred embodiment, the position detection-use magnet 114 is an inexpensive ferrite magnet, while the rotor magnet 113 is an expensive neodymium magnet. Provision of the position detection-use magnet 114 makes it possible to reduce the axial dimension of the rotor magnet 113, and thereby to reduce the production cost of the motor 1. Note that types of the magnets used as the position detection-use magnet 114 and the rotor magnet 113, respectively, are not limited to the aforementioned types of magnets. For example, other types of magnets, such as a neodymium magnet, may be used as the position detection-use magnet 114. Similarly, other types of magnets, such as a ferrite magnet and a neodymium bonded magnet, may be used as the rotor magnet 113.

Referring to FIG. 1, the inner tubular portion 221 is arranged radially inward of the cylindrical portion 213. Hereinafter, the inner tubular portion 221 will be referred to as a "stationary tubular portion", while the cylindrical portion 213 will be referred to as a "rotating tubular portion". Both of the stationary tubular portion 221 and the rotating tubular portion 213 are cylindrical and centered on the central axis J1. The stationary tubular portion 221 is arranged to extend upward into the rotating tubular portion 213. In addition, the bearings 13, defining a pair, are arranged to support the shaft 111 inside the stationary tubular portion 221.

Accordingly, a reduction in the axial dimension of the motor 1 is achieved compared with the case where the bearings 13 are arranged on both axial sides of the rotor holder 112. That is, a significant reduction in the axial dimension of the motor 1 is achieved through a structure regarding the arrangement of the bearings 13 and a structure regarding the arrangement of the encoder 14.

Second Preferred Embodiment

Figure 5:
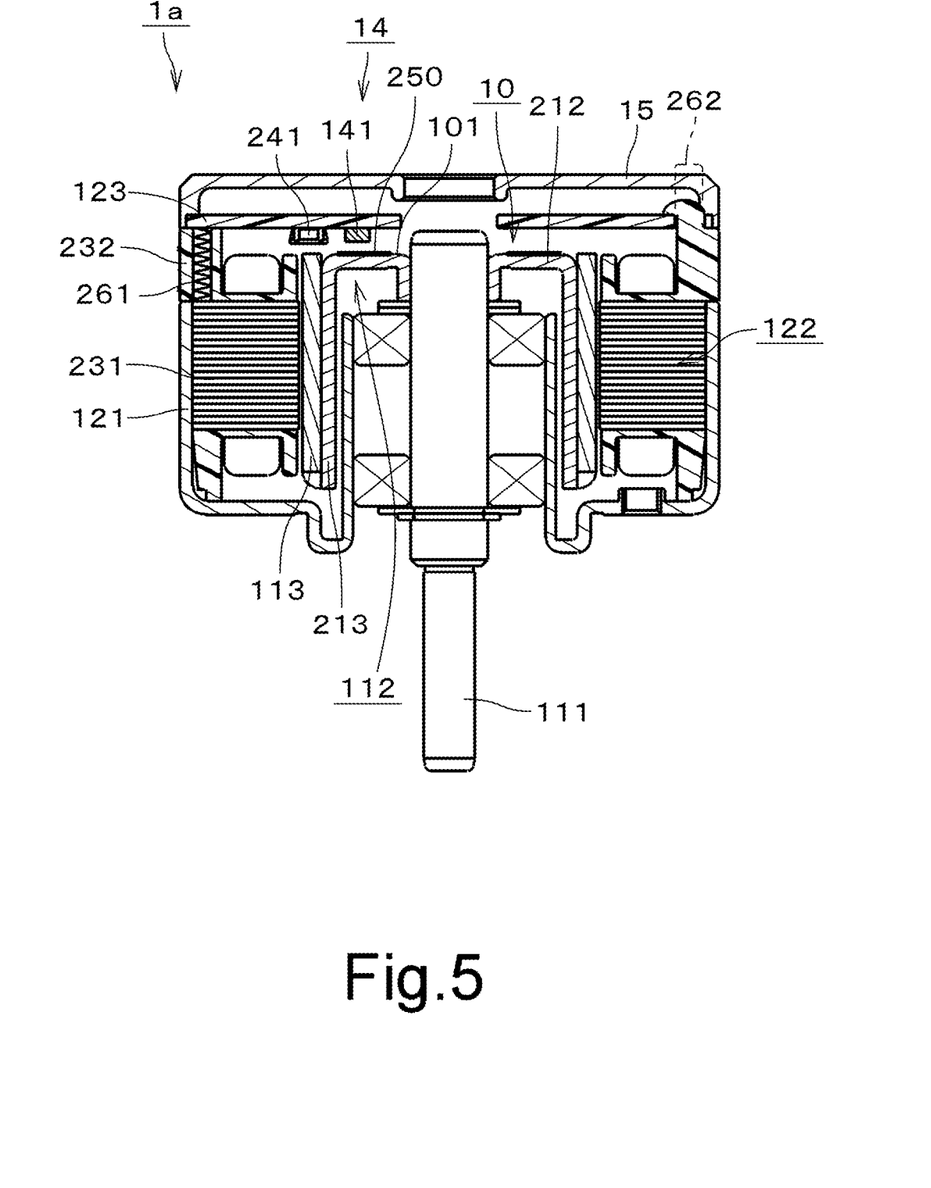
FIG. 5 is a vertical cross-sectional view of a motor according to a second preferred embodiment of the present invention.

FIG. 5 is a vertical cross-sectional view of a motor 1a according to a second preferred embodiment of the present invention. The motor 1a is different from the motor 1 illustrated in FIG. 1 in that the position detection-use magnet 114 is eliminated, and that a cap member 15 is provided over the stator 122. The rotor magnet 113 is arranged to extend over an entire length of the cylindrical portion 213. The position detection sensor 241 is arranged axially opposite the rotor magnet 113.

The reflection pattern 250 is defined on an upper surface of the lid portion 212 through printing. Specifically, supposing that the rotating body 10 is defined as an entire portion of the rotating portion 11 except for the shaft 111, the reflection pattern 250 is defined on a surface 101 of the rotating body 10 which is opposed to the circuit board 123 through printing. The rotating body 10 is fixed to the shaft 111, and includes the rotor magnet 113 arranged in the outer circumference thereof. The reflection pattern 250 includes multiple regions having a high reflectivity and multiple regions having a low reflectivity arranged in the circumferential direction. For example, white regions and black regions may be arranged alternately in the circumferential direction to define the reflection pattern 250. In place of the white regions, portions of a surface of the rotor holder 112 may be used as the regions having a high reflectivity to define the reflection pattern 250. The rotation detection sensor 141 is arranged axially opposite the reflection pattern 250. The reflection pattern 250 and the rotation detection sensor 141 together constitute the encoder 14. The motor 1a is otherwise substantially similar in structure to the motor 1 illustrated in FIG. 1, and equivalent members or portions are denoted by the same reference numerals.

The cap member 15 is arranged on the insulator 232 to cover an upper side of the circuit board 123. This leads to reduced intrusion of dust into the motor 1a.

Moreover, as illustrated in FIG. 5, the insulator 232 includes a through hole defined therein. This through hole is arranged to extend in the axial direction. The through hole has a coil spring 261 inserted therein. The coil spring 261 is arranged to electrically connect the circuit board 123 and the stator core 231 to each other. As mentioned above, both of the cover member 121 and the stator core 231 are electrically conductive. The cover member 121 is arranged in direct contact with the stator core 231, so that the cover member 121 is arranged in electrical connection with the circuit board 123 through the stator core 231 and the coil spring 261. Therefore, the circuit board 123 is grounded when the cover member 121 is grounded.

In FIG. 5, a pin 262 prior to welding defined in the insulator 232 is represented by a chain double-dashed line. The pin 262 is welded to fix the circuit board 123 and the insulator 232 to each other.

In the motor 1a, the reflection pattern 250 is defined in the rotor holder 112 through direct printing. The reflection pattern 250 is thereby defined at a low cost. Moreover, the reflection pattern 250 is never deformed.

Third Preferred Embodiment

Figure 6:
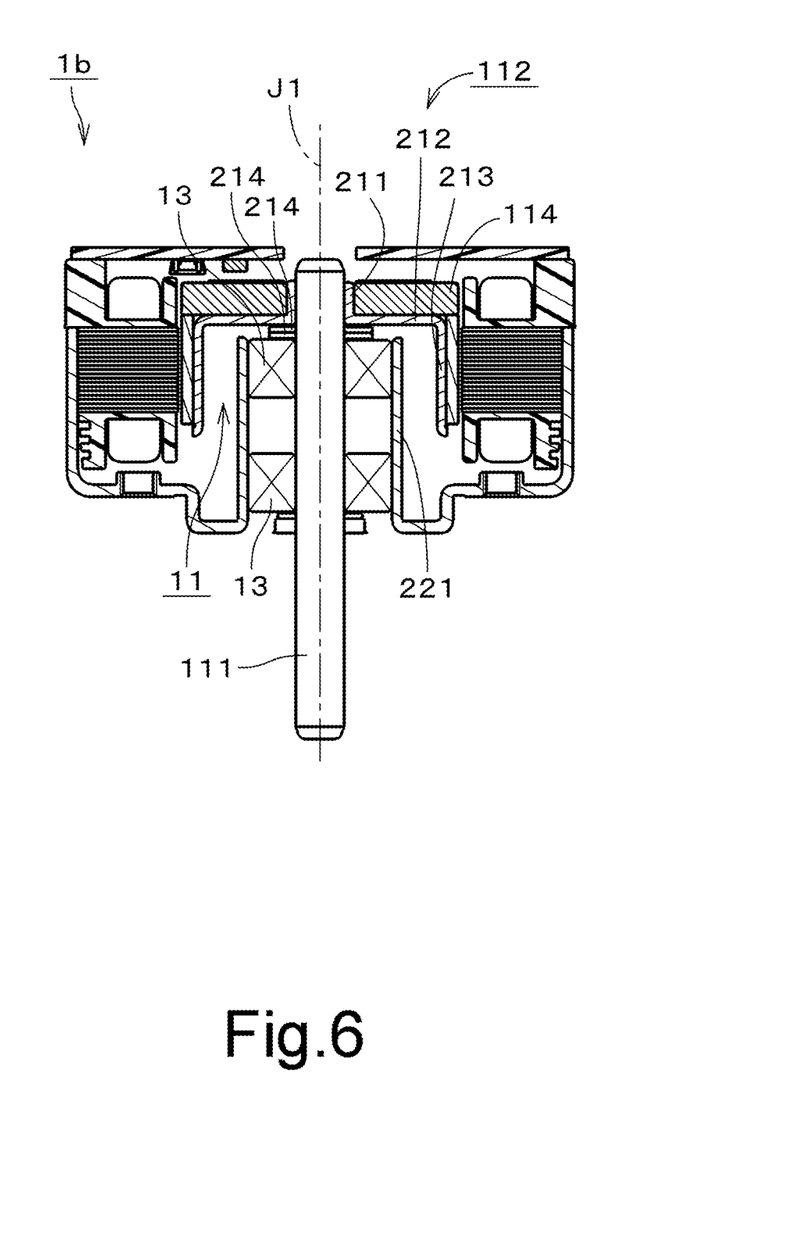
FIG. 6 is a vertical cross-sectional view of a motor according to a third preferred embodiment of the present invention.

FIG. 6 is a vertical cross-sectional view of a motor 1b according to a third preferred embodiment of the present invention. The motor 1b is different from the motor 1 illustrated in FIG. 1 in the shape of the rotor holder 112. The motor 1b is otherwise substantially similar in structure to the motor 1 according to the first preferred embodiment, and equivalent members or portions are denoted by the same reference numerals.

The rotor holder 112 includes the lid portion 212. The lid portion 212 is arranged to be perpendicular or substantially perpendicular to the central axis J1. As in FIG. 1, the lid portion 212 is arranged to close an upper end portion of the rotating tubular portion 213. A top end of the stationary tubular portion 221 is arranged axially opposite the lid portion 212. The shaft fixed portion 211 is arranged to extend along the shaft 111 from a central portion of the lid portion 212 in a direction opposite to a direction in which the rotating tubular portion 213 is arranged to extend from the lid portion 212. The shaft fixed portion 211 is, for example, defined by a burring process. The shaft fixed portion 211 is fixed to the shaft 111 radially inside the position detection-use magnet 114. Accordingly, in comparison to the case of FIG. 1, the upper bearing 13 can be arranged at a higher level to increase the distance between the two bearings 13. This contributes to more stable support of the rotating portion 11.

Note that, in the case of the motor 1b, a bend portion is defined where the shaft fixed portion 211 and the lid portion 212 meet. A gap is defined between the bend portion and the upper bearing 13. Therefore, an increase in the diameter of the resin sheet 214 is preferable. More preferably, two layers of such resin sheets 214 are provided.

Fourth Preferred Embodiment

Figure 7:
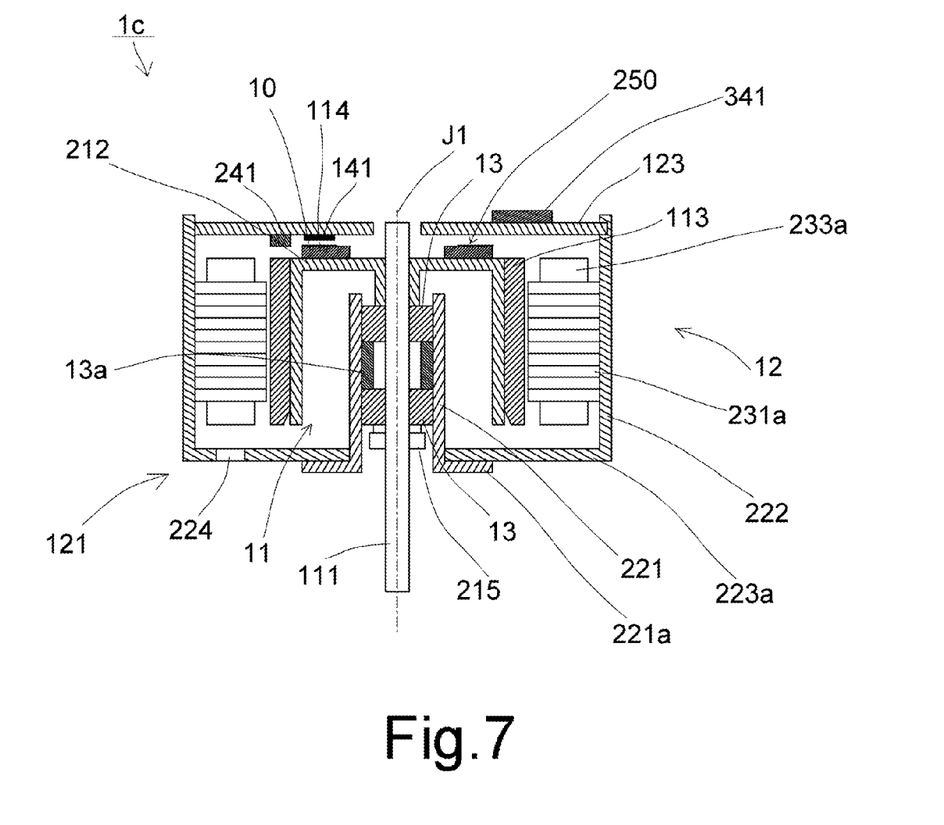
FIG. 7 is a vertical cross-sectional view of a motor according to a fourth preferred embodiment of the present invention.

FIG. 7 is a vertical cross-sectional view of a motor 1c according to a fourth preferred embodiment of the present invention. In contrast to the preferred embodiments described above, the cover member 121 is made up of two components in the present preferred embodiment. A flange portion 221a spreading radially outward away from the central axis J1 is defined at a lower end of the inner tubular portion 221. In the present preferred embodiment, the flange portion 221a is annular. Note, however, that the shape of the flange portion 221a is not limited in any particular manner. For example, a portion of the flange portion 221a may be cut off.

The outer tubular portion 222 and a bottom portion 223a are defined integrally with each other. In other words, the outer tubular portion 222 and the bottom portion 223a, which are together defined in one body, are substantially in the shape of a cylinder with a bottom. A portion of the bottom portion 223a is arranged on the flange portion 221a. The bottom portion 223a and the flange portion 221a are fixed to each other through screwing, welding, or the like, for example. The fitting holes 224 are defined in portions of the bottom portion 223a which are opposed to a stator core 231a. The flange portion 221a is arranged axially below the bottom portion 223a. The flange portion 221a can be used, for example, to position the motor 1c in relation to the office machine.

Both sides of the circuit board 123 are usable for mounting. Electronic components such as the rotation detection sensor 141, the position detection sensor 241, an IC board 341, and so on are mounted on the circuit board 123.

Sleeve bearings are used as the bearings 13 according to the present preferred embodiment. An oil-retaining member 13a is arranged between the bearings 13, which are arranged opposite each other in the axial direction. A felt or the like is used as the oil-retaining member 13a, for example. The oil-retaining member 13a is arranged to retain a lubricating oil and to be able to supply the lubricating oil to the bearings 13. The oil-retaining member 13a is, for example, arranged in the shape of the letter "C" or an annular shape with a cut.

The position detection-use magnet 114 is arranged on the lid portion 212 as in the preferred embodiments described above. The position detection-use magnet 114 is fixed to the lid portion 212 through their own magnetism, adhesion, or the like.

The stator core 231a is provided with a powder coating of an insulating material in place of the insulator. A conducting wire is wound about each of the teeth of the stator core 231a provided with the powder coating, so that coils 233a are defined. The stator core 231a is press fitted and thereby fixed to an inner circumferential surface of the outer tubular portion 222.

An end portion of the rotor magnet 113 may include a cut arranged to extend over an entire circumference thereof or a portion of the entire circumference.

Note that the present invention is not limited to the above-described preferred embodiments, but that a variety of modifications are possible.

Each of the bearings 13 may be a ball bearing. In this case, the bearings 13 are fixed to the inner tubular portion 221 through an adhesive. In the case where a slight increase in the axial dimension of the motor is permitted, the bearings 13 may be arranged on both axial sides of the rotor holder 112. Also, the bearings 13 may be replaced with a single cylindrical sleeve bearing. In this case, it is preferable that an oil-retaining member (e.g., a felt or the like) should be held between an outer circumferential surface of the sleeve bearing and an inner circumferential surface of the inner tubular portion. A decrease in a cost of the motor is thereby achieved.

The reflection pattern 250 may be defined in the rotor magnet 113 or the position detection-use magnet 114 through direct printing. In this case, it is preferable that portions of a surface of the magnet should be used as the black regions in the reflection pattern 250. The lid portion 212 of the rotor holder 112 may be arranged on a lower side. In this case, the position detection-use magnet 114 is arranged on an opening side of the rotor holder 112.

A variety of structures may be adopted for the rotating body 10, which is the entire portion of the rotating portion 11 except for the shaft 111. For example, laminated steel sheets may be used to define the rotating body 10. The reflection pattern 250 may be defined by a variety of other methods as long as the reflection pattern 250 is defined on the surface of the rotating body 10 which is opposed to the circuit board 123. For example, the reflection pattern 250 may be printed on the magnetic sheet 142 without the slits being defined in the magnetic sheet 142.

The rotational position of the rotating body 10 may be detected without use of the position detection sensor 241. For example, it is possible to detect the rotational position of the rotating body 10 by use of an FG signal or a counter-electromotive force generated in the stator 22.

The coil spring 261 may be replaced with another electrically conductive elastic member as long as this elastic member is arranged between the stator core 231 and the circuit board 123, and is capable of being elastically deformed and pressed against the stator core 231 and the circuit board 123 to bring the circuit board 123 and the cover member 121 into electrical connection with each other. For example, an electrically conductive rubber, a leaf spring, or the like may be used as such an electrically conductive elastic member.

The cap member 15 may be arranged to extend up to the outer tubular portion 222 without the insulator 232 being exposed. Alternatively, the outer tubular portion 222 may be arranged to extend further upward.

Figure 8:
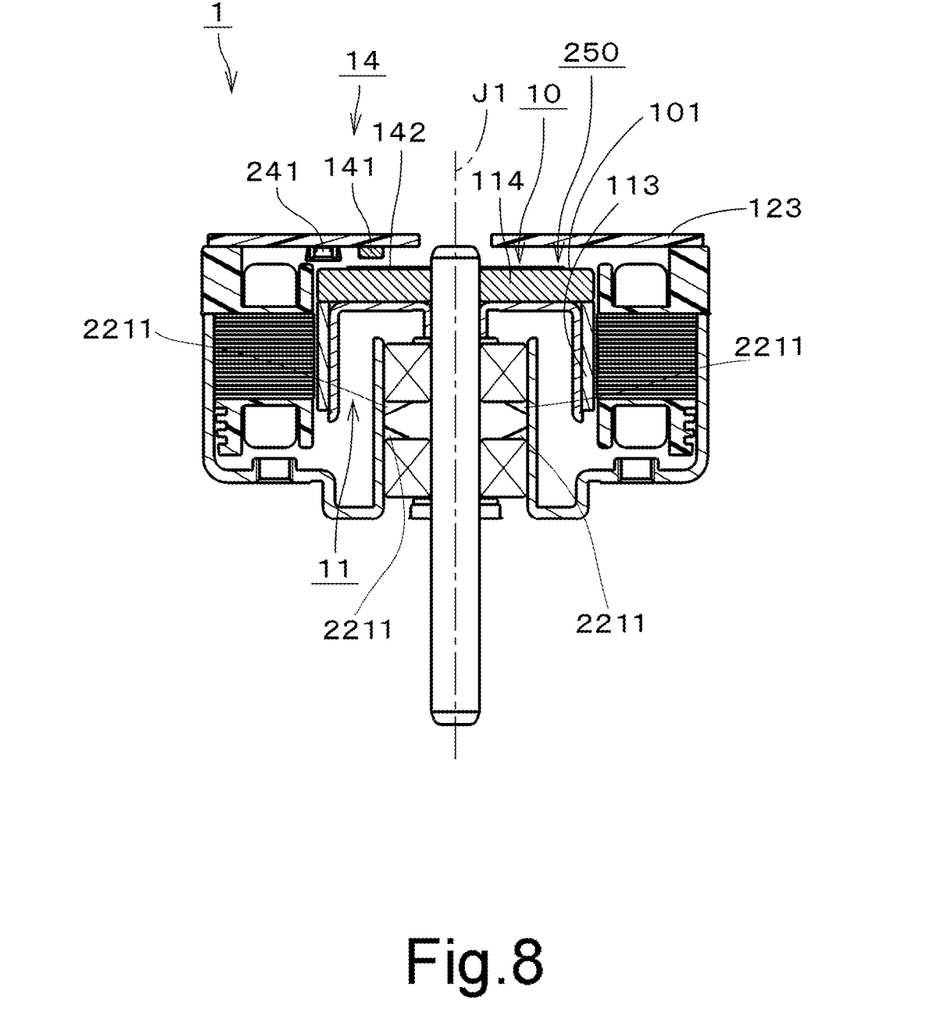
FIG. 8 is a vertical cross-sectional view of a motor according to a preferred embodiment of the present invention.

Referring to FIG. 8, the stationary tubular portion 221 may be provided with a plurality of projection portions 2211. The projection portions 2211 are arranged to project radially inward from an inner circumferential surface of the stationary tubular portion 221. Each of the projection portions 2211 is arranged to support one of the bearings 13, so that axial positioning of the bearings 13 is achieved. In a preferred embodiment of the present invention illustrated in FIG. 8, the number of projection portions 2211 is three. The projection portions 2211 are arranged at regular intervals in the circumferential direction on the inner circumferential surface of the stationary tubular portion 221. Note that the projection portions 2211 may not necessarily be arranged at regular intervals on the inner circumferential surface of the stationary tubular portion 221.

The projection portions 2211 are defined simultaneously when the cover member 121, which includes the stationary tubular portion 221, the outer tubular portion 222, and the bottom portion 223, is shaped. A portion of the plate material which is to define the stationary tubular portion 221 is subjected to a driving process to define portions projecting perpendicular or substantially perpendicularly to a surface of the plate material. Thereafter, the plate material is subjected to the press working to shape the stationary tubular portion 221, the outer tubular portion 222, and the bottom portion 223. In this manner, the projection portions 2211 are defined simultaneously with the shaping of the cover member 121.

Features of the above-described preferred embodiments and modifications thereof may be combined as appropriate as long as no conflict arises.

The present invention is applicable to motors used for a variety of purposes.

What is claimed is:

1. A motor comprising:
   a shaft;
   a bearing arranged to support the shaft such that the shaft is rotatable about a central axis;
   a rotating body fixed to the shaft, the rotating body comprising
      a lid portion having an upper surface extending radially from the shaft to a first edge;
      a cylindrical portion extended from the first edge to a second edge, the cylindrical portion having an outer circumference, the cylindrical portion forming an inner space, a part of the bearing being housed inside the inner space; and
      a rotor magnet provided on the outer circumference;
   a stator arranged radially outward of the rotor magnet;
   a circuit board fixed to the stator, the circuit board arranged to be perpendicular to the central axis, the circuit board placed on one axial side of the rotating body such that the circuit board is closer to the lid portion than to the second edge; and
   an encoder arranged to detect rotation of the rotating body;
   wherein the encoder includes:
   a reflection pattern arranged on or above the upper surface of the lid portion of the rotating body which is opposed to the circuit board, wherein a portion of the reflection pattern is defined by a surface of a magnet provided on the lid portion of the rotating body; and
   a reflective rotation detection sensor arranged on the circuit board to detect the rotation of the rotating body by irradiating the reflection pattern with light;
   wherein the rotating body further includes a position detection-use magnet, the position detection-use magnet being annular and centered on the central axis, and arranged opposite the circuit board;
   wherein the circuit board has mounted thereon a position detection sensor arranged to detect magnetic field generated by the position detection-use magnet to detect a rotational position of the rotating body; and
   wherein a portion of the reflection pattern is defined by a surface of the position detection-use magnet.

2. The motor according to claim 1, wherein the position detection-use magnet has sucked thereto a magnetic sheet including a large number of slits arranged in a circumferential direction to define the reflection pattern on the position detection-use magnet.

3. The motor according to claim 1, wherein the reflection pattern is printed on the rotating body.

4. The motor according to claim 1, further comprising a stationary portion including the stator, wherein
   the rotating body includes a rotating tubular portion centered on the central axis;
   the stationary portion includes a stationary tubular portion arranged to extend along the central axis into the rotating tubular portion; and
   the bearing is arranged to support the shaft inside the stationary tubular portion.

5. The motor according to claim 4, wherein
   the lid portion is arranged axially opposite a top end of the stationary tubular portion, and arranged to close an end portion of the rotating tubular portion; and
   a shaft fixed portion is fixed to the shaft and arranged to extend in an axial direction from a central portion of the lid portion.

6. The motor according to claim 4, wherein
   the stationary portion further includes an outer tubular portion and a bottom portion arranged to join a lower end of the stationary tubular portion and a lower end of the outer tubular portion to each other; and
   the bottom portion includes a plurality of fitting holes defined therein.

7. The motor according to claim 4, wherein the stationary tubular portion includes a flange portion arranged at the lower end thereof to spread radially outward away from the central axis.

8. The motor according to claim 7, wherein
   the stationary portion further includes an outer tubular portion and a bottom portion arranged to join a lower end of the stationary tubular portion and a lower end of the outer tubular portion to each other;
   the outer tubular portion is defined integrally with the bottom portion such that a combination of the outer tubular portion and the bottom portion is arranged substantially in a shape of a cylinder with a bottom; and
   a portion of the bottom portion is arranged on the flange portion.

9. The motor according to claim 8, wherein the flange portion is arranged axially below the bottom portion.

10. The motor according to claim 4, wherein
    the stationary portion further includes an outer tubular portion and a bottom portion arranged to join a lower end of the stationary tubular portion and a lower end of the outer tubular portion to each other; and
    a portion of the bottom portion and a portion of the stationary tubular portion are arranged to together define a projecting portion arranged to project axially downward where the bottom portion and the stationary tubular portion meet.

11. The motor according to claim 4, wherein
    the stationary portion further includes a plurality of projection portions arranged to project radially inward from an inner circumferential surface of the stationary tubular portion; and
    each of the projection portions is arranged to support the bearing.

12. The motor according to claim 1, wherein the reflection pattern comprises an encoder disc including slits such that the surface of the position detection-use magnet is exposed through the slits.

* * * * *